United States Patent
Bruhn

(10) Patent No.: US 9,258,429 B2
(45) Date of Patent: Feb. 9, 2016

(54) ENCODER ADAPTION IN TELECONFERENCING SYSTEM

(75) Inventor: Stefan Bruhn, Sollentuna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 297 days.

(21) Appl. No.: 13/698,078

(22) PCT Filed: May 18, 2010

(86) PCT No.: PCT/SE2010/050535
§ 371 (c)(1),
(2), (4) Date: Nov. 15, 2012

(87) PCT Pub. No.: WO2011/145987
PCT Pub. Date: Nov. 24, 2011

(65) Prior Publication Data
US 2013/0066641 A1 Mar. 14, 2013

(51) Int. Cl.
*G10L 19/00* (2013.01)
*H04M 3/56* (2006.01)

(52) U.S. Cl.
CPC .................................... *H04M 3/569* (2013.01)

(58) Field of Classification Search
CPC ......... H04M 3/568; H04M 3/56; H04M 3/06; H04M 3/562; G10L 19/08; G10L 19/17; G10L 19/06; G10L 19/26; H04W 4/06
USPC ................. 704/500, 201, 207, 219, 221, 275; 370/260, 337, 535; 379/202.01; 381/22; 700/94; 710/62; 725/37
See application file for complete search history.

(56) References Cited

U.S. PATENT DOCUMENTS

| | | | | |
|---|---|---|---|---|
| 5,914,947 A | * | 6/1999 | Saito | H04B 7/2628 370/320 |
| 6,522,633 B1 | | 2/2003 | Strawczynski | |
| 6,628,999 B1 | * | 9/2003 | Klaas | H04H 60/04 381/104 |
| 6,813,528 B1 | * | 11/2004 | Yang | G06F 1/1632 381/306 |
| 8,515,039 B2 | * | 8/2013 | Gilg | H04M 3/568 370/260 |
| 2001/0033585 A1 | * | 10/2001 | Lazarus | H04J 3/0605 370/535 |
| 2002/0116708 A1 | * | 8/2002 | Morris | H04N 21/2381 725/37 |

(Continued)

FOREIGN PATENT DOCUMENTS

EP 1855455 A1 11/2007
WO 02063828 A1 8/2002

OTHER PUBLICATIONS

Homayounfar, K., "Rate Adaptive Speech Coding for Universal Multimedia Access", IEEE Signal Processing Magazine, Mar. 1, 2003, pp. 30-39, vol. 20, No. 2.

*Primary Examiner* — Michael Colucci
(74) *Attorney, Agent, or Firm* — Patent on Demand, P.A.; Brian K. Buchheit; Scott M. Garrett

(57) ABSTRACT

The invention relates to a method and an arrangement for encoding of signals in teleconferencing. The method involves receiving (502) signals from a plurality of nodes participating in a teleconference and analyzing (504) said signals. The method further involves appointing (506) one of the received signals as being a dominant signal and adapting (508) an encoder based on information related to the dominant signal. At least two of the received signals are mixed and then encoded (512), using the adapted encoder. The encoded mixed signal is then provided (514) to at least one of the nodes participating in the teleconference.

24 Claims, 8 Drawing Sheets

(56) References Cited

U.S. PATENT DOCUMENTS

| | | | |
|---|---|---|---|
| 2002/0123895 A1* | 9/2002 | Potekhin | H04L 12/1813 704/275 |
| 2003/0065506 A1* | 4/2003 | Adut | G10L 19/18 704/207 |
| 2004/0204944 A1* | 10/2004 | Castillo | G10L 19/00 704/500 |
| 2006/0010267 A1* | 1/2006 | Abullarade | G06F 3/162 710/62 |
| 2007/0127671 A1* | 6/2007 | Chua | H04M 3/002 379/202.01 |
| 2007/0299661 A1* | 12/2007 | Raad | H04M 3/568 704/221 |
| 2008/0101577 A1* | 5/2008 | Frankel | H04M 3/56 379/202.01 |
| 2008/0195397 A1* | 8/2008 | Myburg | G10L 19/24 704/500 |
| 2009/0228290 A1* | 9/2009 | Chen | G10L 19/0017 704/500 |
| 2010/0063801 A1* | 3/2010 | Bruhn | G10L 19/26 704/201 |
| 2010/0223053 A1* | 9/2010 | Sandgren | G10L 19/173 704/219 |
| 2010/0322429 A1* | 12/2010 | Norvell | G10L 19/24 381/22 |
| 2011/0038281 A1* | 2/2011 | Saleem | H04L 12/1822 370/260 |

\* cited by examiner

ENCODER ADAPTION IN TELECONFERENCING SYSTEM

TECHNICAL FIELD

The invention relates to teleconferencing services in a communication system, and especially to the encoding of signals related to nodes participating in a teleconference.

BACKGROUND

Teleconferencing is widely used, e.g., as an alternative to meeting in person. The possibility of teleconferencing reduces the need to travel to a certain location to attend a meeting, which saves both time and money, and furthermore is environmental friendly. However, a high perceived sound quality is important in order for teleconferencing to be a satisfactory alternative to a meeting in person Below, an example of a teleconferencing system according to the prior art is described with reference to FIGS. 1 and 2. FIG. 1 shows a schematic view of a multi party teleconferencing system with N users 102:1-N, here represented by UEs (User Equipments), N channels 106:1-N, and a conferencing bridge, in the form of a Multipoint Control Unit (MCU) 104. Each UE has a microphone, a loudspeaker, and signal processing capabilities for, e.g., signal capture, coding and transmission, signal reception, decoding and playback. The UEs 102:1-N send speech or audio signals recorded and encoded at their respective ends to the MCU 104, which decodes these signals from all channels into a PCM (Pulse Code Modulation) representation. After that the PCM signals are digitally mixed, re-encoded and finally transmitted to the connected UEs.

This principle is further illustrated in FIG. 2, which shows the specific signal processing flow for an exemplary UE "K", 202:K. The UE 202:K comprises an encoder 206:K, for encoding a signal, received by a microphone 216:K and typically subject to some signal processing, to be sent to an MCU 204. In the MCU 204, the encoded signal from UE 202:K is decoded using a decoder 208:K. The MCU 204 comprises a set of decoders, 208:1-N, for decoding the respective signals arriving from the different parties taking part in a teleconference. The decoded signals, which are in PCM-representation, are then mixed, e.g. added together, in a Mixer 210. Then, the mixed signal, which is to be provided to the participant UE K, is encoded in an encoder 212:K, and is, when received by UE 202:K, decoded using a decoder 214:K.

For certain reasons, e.g. to reduce the background noise level of the transmitted signal, some implementations of multi party bridges only mix the incoming signals from a fixed subset of the parties, e.g. 3 or 4. The subset of parties is typically selected on the basis of signal level and speaker activity of the different parties, where the signals of the most recent active speakers are retained in the subset if no speaker activity is present from any other party. Another possible modification to the basic operation illustrated in FIG. 2 is that the signal coming from party K may be excluded from the sum of signals transmitted back to party K. The reason for this is that since there is a significant transmission delay present in the system, the microphone signal, transmitted forth and back to and from the MCU would be perceived as an undesirable echo when emitted from the loudspeaker 218:K. Instead, typically, the microphone signal from party K is presented in the loudspeaker 218:K of UE K, as the so-called side-tone that is generated locally in the UE.

There are certain types of speech codecs that allow mixing of the signals received from the different channels in the coded speech domain or the speech codec parameter domain. For this class of codecs the decoders 208 and encoders 212 can be omitted or at least reduced to mappings between coded speech and speech codec parameter domains.

Scalable Codecs

Scalable, or embedded, coding is a coding paradigm in which the coding of signals is done in layers. A block diagram illustrating the basic principle of scalable codecs is shown in FIG. 3. In a base, or core, layer 306, the signal is encoded at a low bit rate, while additional layers 308, each on top of the previous layer, provide some enhancement relative to the coding which is achieved in all layers from the core up to the respective previous layer. Each layer adds some additional bit rate. The generated bit stream is embedded, meaning that the bit stream of lower-layer encoding is embedded into the bit streams of higher layers. This property makes it possible, anywhere in the transmission or in a receiver, to drop the bits belonging to one or more higher layers. Such a "stripped" bit stream can still be decoded up to the layer of which the bits are retained. Therefore, scalable coding is suitable for use in bandwidth limited services involving multiple parties with different requirements, such as e.g. teleconferencing, and especially over wireless links of limited and/or potentially varying bandwidth.

One example of using scalable speech codecs in multi-party conferencing systems is described in [7]. According to said publication, it is foreseen to use the scalable wideband extended codec according to ITU-T (International Telecommunication Union-Telecommunication Standardization Sector) recommendation G.711.1 [8] for a low complexity partial narrowband (NB) mixing and a selective switching of the wideband extension signal from the dominant channel. This principle is illustrated in FIG. 4. Here, the coded signal from each channel, or location, comprises the NB core layer, denoted "primary" in the figure, and the wideband (WB) enhancement layer, denoted "secondary" in the figure. The MCU carries out conventional mixing, i.e. addition, of only the G.711 NB core layer signals, while the enhancement layer of only the most active location is retained. The advantage of this concept lies in the low complexity required to mix G.711 core layer encoded signals, since they are in PCM format, and to switch through the wideband enhancement layer of the active channel, to avoid decoding and re-encoding of that layer. However, this solution is only beneficial in implementations where the mixing of the core layer is performed in the coded speech domain or speech codec parameter domain, or when using G.711, where the coding is PCM.

Problems with Existing Solutions

Typically, teleconference systems involving mixing of a plurality of channels require decoding of the signals of the various incoming channels to make them available in the PCM domain, in which they can be mixed. The mixed PCM signal is then re-encoded such that it is suitable for transmission to a receiving terminal K. This means that there are at least two speech codecs in tandem configuration: The first codec is operated with encoding at the sending parties, A through K, and with decoding in the MCU; the second codec is operated with encoding of the mixed PCM signal in the MCU and decoding of that signal at the receiving terminal K.

One problem associated with this kind of processing is a quality degradation that arises from the tandem configuration of codecs. Each stage of de-coding and re-encoding increases the coding distortions in the finally decoded output signal.

A further quality problem arises from the fact that speech codecs are typically designed to work well with a single speech signal, since the speech codecs are built upon a speech production model that mimics the human vocal tract. When a mixed signal to be encoded comprises speech from a plurality of speakers talking simultaneously or the active speaker signal together with a significant amount of background noise signals from the other channels, which both are typical situations in teleconferencing, this speech production model does no longer apply. Consequently, the quality of the decoded mixed signal at terminal K may be poor due to significant coding distortions.

Other Techniques Avoiding Degradations Due to Codec Tandeming

There are examples of speech/audio codecs that allow the mixing operation to be performed in the coded domain. Hence, referring to FIG. 2, essentially the decoder and encoder blocks in the MCU are not required for such a case. Examples of codecs allowing mixing in the coded domain are frequency domain codecs such as e.g. MPEG-4 AAC (Moving Picture Expert Group Advanced Audio Coding) [5] and also the MPEG SAOC (Spatial Audio Object Coding) [6], presently being under standardization. However, these codecs, as they are not based on a speech production model, are less suitable for use for teleconferencing in many communication systems and especially mobile communication systems that require very bit rate efficient operation in order to save limited transmission capacity.

Further, a compressed domain conference bridge is described in [9], where the incoming signals of one or two of the most active channels are re-encoded through a compressed domain transcoder. The choice of whether either one or two simultaneous channels are to be encoded in the bridge depends on the capability of the codec supported by the receiving terminal. This kind of bridge avoids tandem coding artifact to some extent by performing the transcoding in the speech codec parameter domain rather than in the decoded speech (PCM) domain, and through the use of a special speech codec that is especially designed to be able to cope with two simultaneous speaker signals. However, as with the codecs described in [5] and [6] the constraint of having a codec for teleconferencing use that allows transcoding or mixing of the signals from the conference participant in the codec parameter domain is a severe limitation and is generally prohibitive for achieving high coding efficiency. It is hence undesirable to use specially designed codecs for multiparty conference use, since the cost in terms of bit rate need for such codecs typically is much higher than for high efficient state-of-the-art codecs which often follow the analysis-by-synthesis principle with an assumed speech production model.

SUMMARY

It would be desirable to achieve an enhanced quality in teleconferencing systems without constraining the speech codec type to be used to a type that allows for mixing in the speech codec parameter domain. It is an object of the invention to enhance the perceived quality of a teleconferencing system using codecs which do not allow mixing in the coded speech or speech codec parameter domain. Further, it is an object of the invention to provide a method and an arrangement for encoding of speech signals e.g. in a teleconferencing system. The objects can be achieved by methods and arrangements according to the enclosed independent patent claims. Preferred embodiments are defined by the dependent claims.

According to one aspect, a method is provided for encoding signals in teleconferencing. Within the method, signals from a plurality of nodes participating in a teleconference are received. The received signals are analyzed, and one of the received signals is appointed to be a dominant signal. An encoder is then adapted based on information related to the dominant signal. At least two of the received signals are mixed together. A mixed signal, comprising at least two of the received signals is encoded using the adapted encoder, after which the encoded signal is provided to at least one of the nodes participating in the teleconference.

According to another aspect, an arrangement is provided, which is adapted to encode signals in teleconferencing. The arrangement comprises a functional unit adapted to receive signals from a plurality of nodes participating in a teleconference. The arrangement further comprises a functional unit adapted to analyze the received signals, and a functional unit, which is adapted to appoint one of the received signals as being a dominant signal. The arrangement further comprises a functional unit adapted to adapt an encoder based on information related to the dominant signal. The arrangement further comprises a functional unit adapted to mix at least two of the received signals, and an encoder adapted to encode mixed signals received from the mixing functional unit. The arrangement further comprises a functional unit adapted to provide the encoded mixed signal to at least one of the nodes participating in the teleconference.

The above method and arrangement may be used for improving the quality in a teleconferencing system, by adapting the encoding, in a mixing entity, of the signals received from participating nodes to the presumed most important signal, i.e. the dominant signal, such that the encoding of the dominant signal is improved. The encoding of the dominant signal could be said to be improved at the sacrifice of the encoding quality of the other, mixed signals.

The above method and arrangement may be implemented in different embodiments. In some embodiments, the dominant signal or an indication of the dominant signal is provided separately to the mixing functional unit and/or the adapted encoder. This enables these unit to exercise special treatment of the dominant signal. In some embodiments, the mixed encoded signal to be provided to a node k does not comprise the received signal from said node k This may avoid undesired perceived echoes in the loudspeaker of node k, e.g. UE k.

In some embodiments, the encoder is adapted to base parameter analysis on the dominant signal. Parameter analysis could comprise one or more of IPC analysis, open-loop pitch analysis, closed-loop pitch analysis, gain parameter analysis, and voicing parameter analysis. The parameter analysis could be based on a PCM representation of the dominant signal, and/or coded parameters of the dominant signal as received from a node, i.e. prior to initial decoding. These features could be used to enable the encoder to improve the quality of the encoding of the dominant signal.

In some embodiments, the encoder is part of a scalable codec, comprising a primary codec providing primary encoding/decoding and at least a secondary codec providing secondary encoding/decoding. The primary encoder could be fed only with the dominant signal. The secondary encoder could be used for encoding the mixed signal, and if the mixed signal comprises the dominant signal, the dominant signal, or an approximation of the dominant signal, could be removed, at least partly, from the mixed signal before secondary encoding. Thus, the encoder could improve the quality of the encoding of the dominant signal when the encoder is part of a scalable codec, by allowing the coding distortion with respect to the dominant channel signal to be minimized. Further, the primary codec could be parameter compatible with a codec used for decoding the received dominant signal. This would provide a convenient way of adapting the encoder to the dominant signal, by e.g. providing codec parameters related to the dominant signal for use in the primary codec. Thus, parameter re-estimation and quantization is avoided and no additional parameter distortion is introduced.

BRIEF DESCRIPTION OF DRAWINGS

The invention will now be described in more detail by means of exemplary embodiments and with reference to the accompanying drawings, in which.

DETAILED DESCRIPTION

Briefly described, a method and an arrangement are provided, which can be used for improving the perceived sound quality in teleconferencing systems using speech codecs in tandem configuration. This is achieved by selecting one of the participating parties as being the dominant party, and adapting a codec used for encoding the combined signals received from the participating parties, based on information related to the dominant signal, i.e. the signal received from the dominant party.

Within this document, the term "codec" is used in its conventional meaning, i.e. as referring to an encoder and/or decoder.

An observation relevant for the invention is that there, typically, is one dominant party at a time in a teleconference. Typically, the dominant party is the active speaker. Even though there simultaneously may be other voices and background noise present from other parties, these sounds are usually distinguishable from the voice of the active speaker. With the assumption that there is one dominant party, the invention in a general sense is to modify the encoding of a mixed signal comprising signals from the participating parties, such that the distortion related to codec tandeming of the signal from the dominant party is minimized, while less focus is put on properly encoding the signals from the other parties. An essential element of this idea is that the encoder of the mixed signal has access to information related to the presently active speaker signal, in whatever form, before the mixing. The encoder could be adapted based on the active speaker signal or related codec parameters. The adaptation of the encoding of the mixed signal is done such that the distortions related to tandem coding with respect to that active speaker are minimized.

The "dominant signal" does not literally need to be dominating the other signals. It may e.g. be a talker or a channel that is dominating in some sense, thus resulting in that the signal related to this talker or channel is appointed "dominant signal". The channel conveying the dominant signal will thus be denoted "dominant channel", and the node using the dominant channel for transmitting the dominant signal will be denoted "dominant node" or "dominant party". Instead of "dominant", other terms could be used, such as e.g. "active" or "most significant".

The appointment of the dominant signal could be weighted, such that the signals from one or more nodes, users or channels have a higher probability of being appointed dominant signal than other signals. The weighting could be based e.g. on node type, codec type used in node, level of background noise, location of node, or IP-address. Further, the signal from the initiator of a teleconference could be positively weighted.

Figure 1:
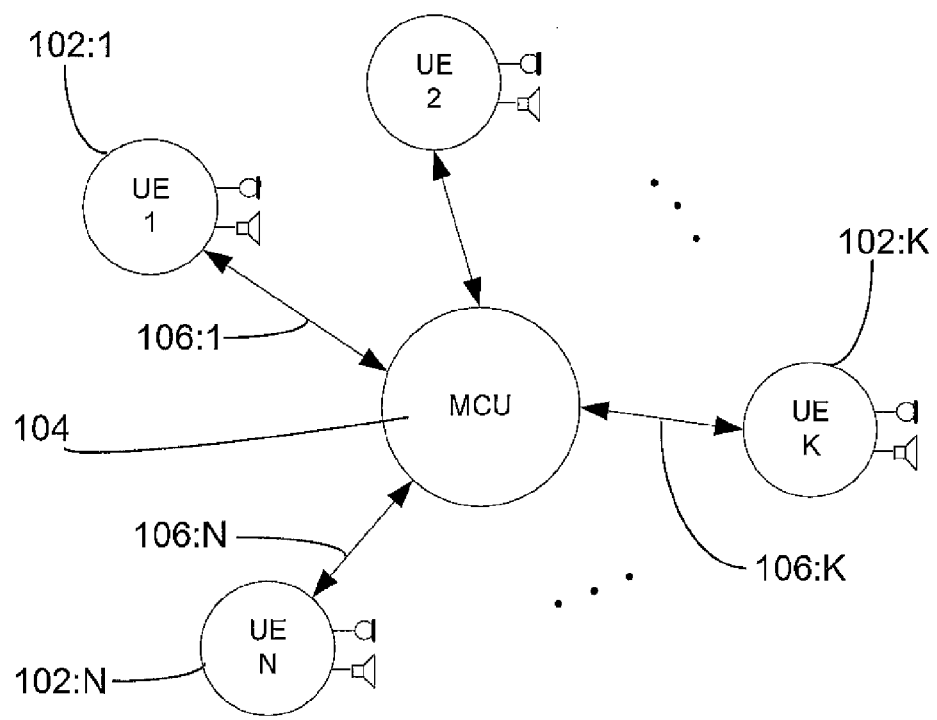
FIG. 1 is a schematic view illustrating a teleconferencing system according to the prior art.
Figure 2:
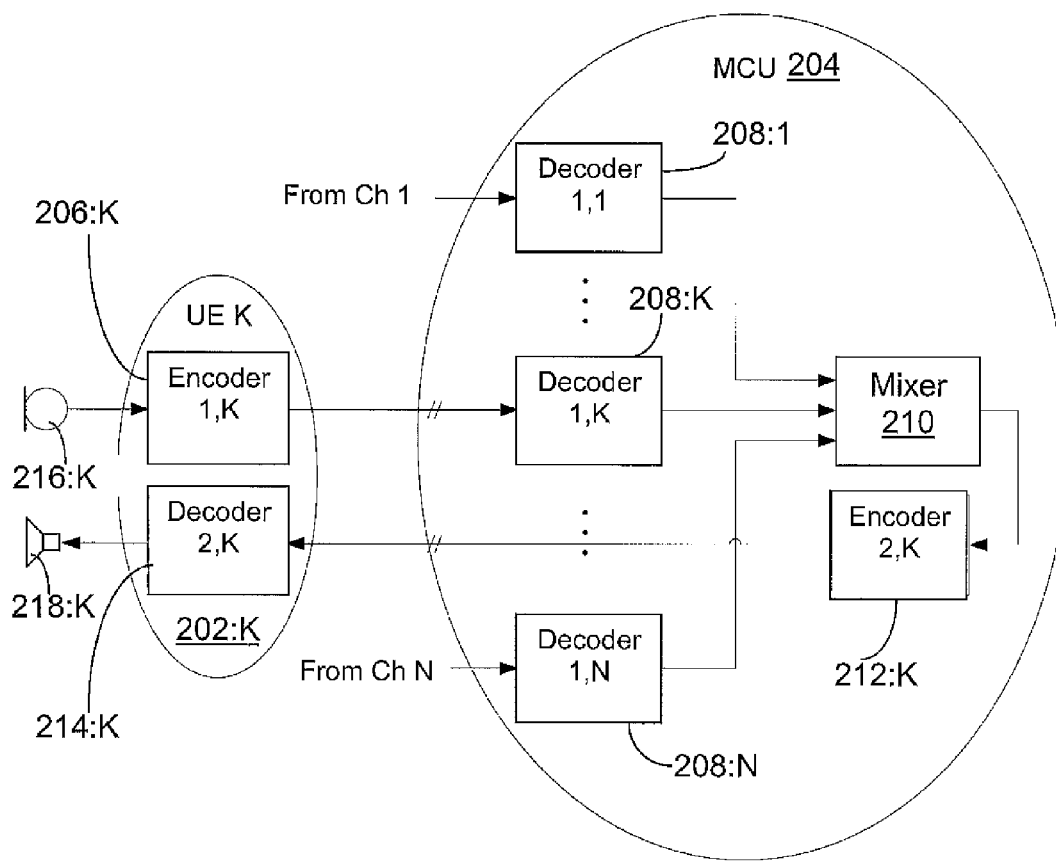
FIG. 2 is a schematic view illustrating a signal processing flow in a teleconferencing system for a certain UE, according to the prior art.
Figure 3:
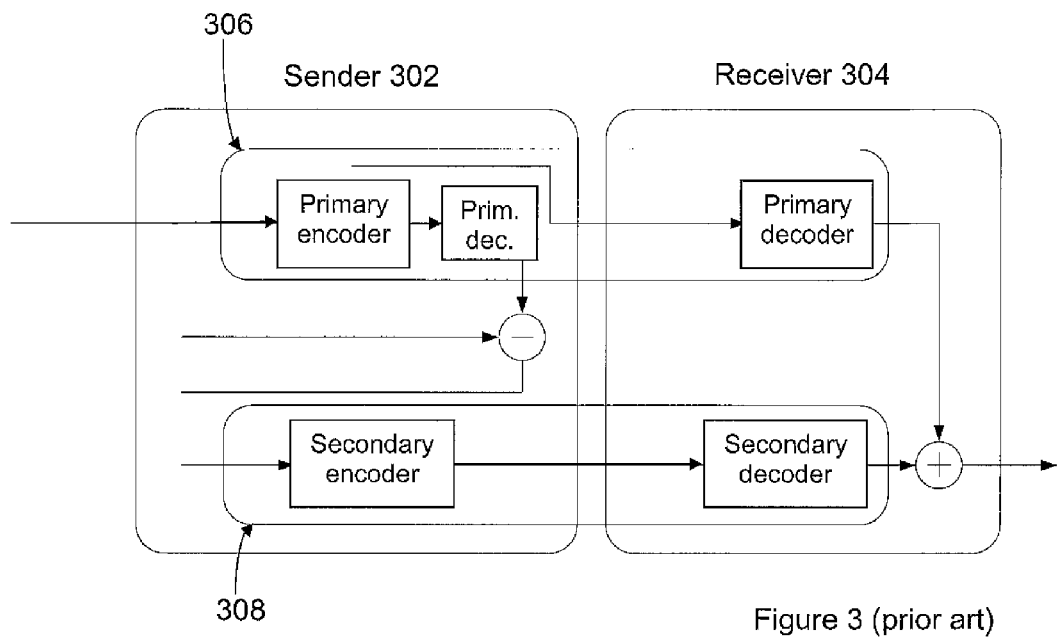
FIG. 3 is a schematic view illustrating the principle of an embedded scalable codec, according to to the prior art.
Figure 4:
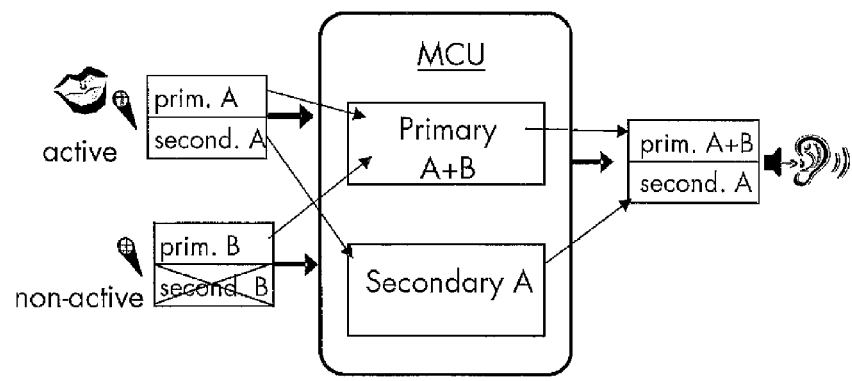
FIG. 4 is a schematic view illustrating a teleconferencing system using codecs following the G.711 standard, according to to the prior art.
Figure 5:
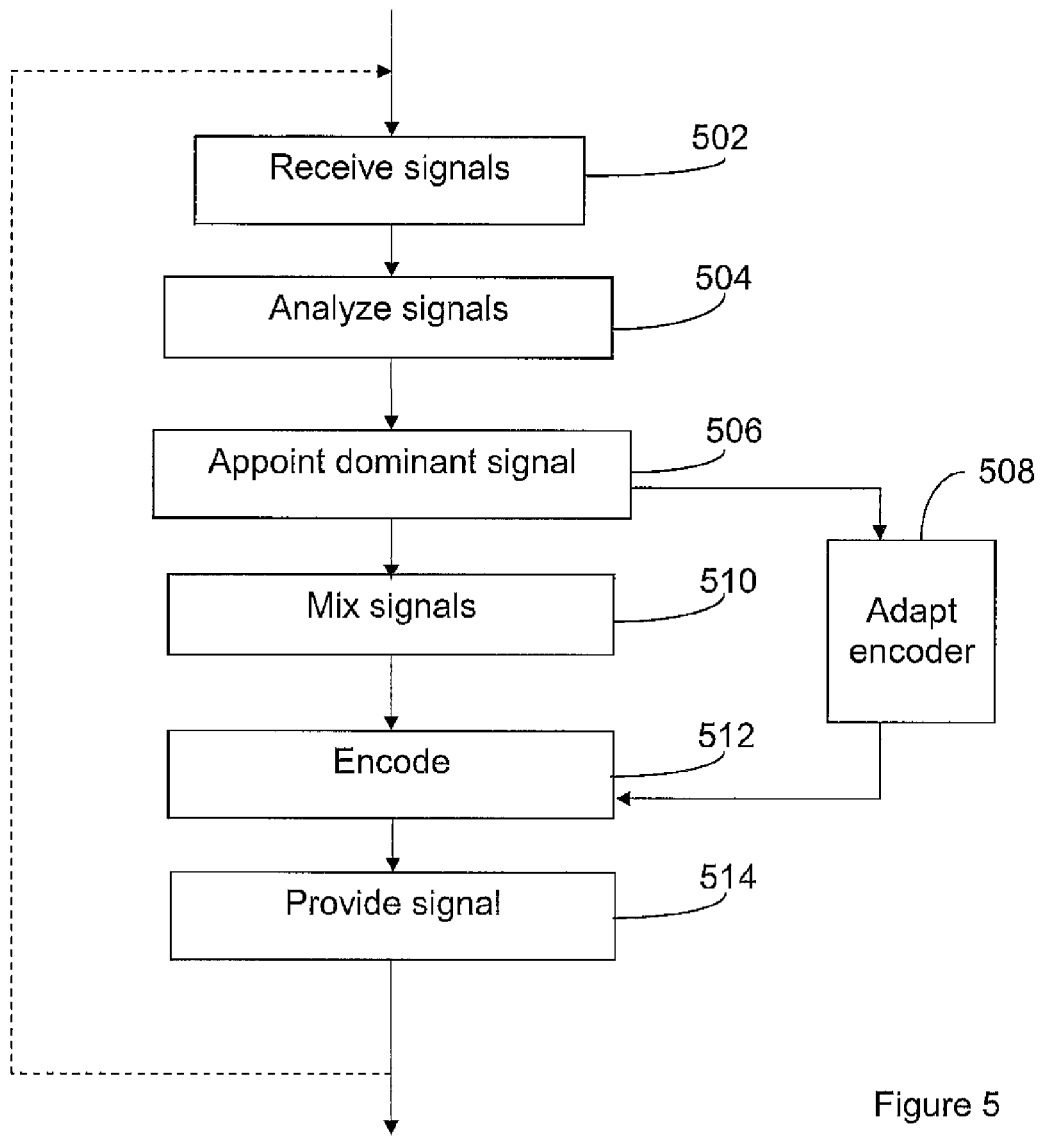
FIG. 5 is a flow chart illustrating procedure steps according to an embodiment

Exemplary Procedure, FIG. 5

An embodiment of the procedure of adapting a codec to a signal from one of the parties in a multi-user teleconference will now be described with reference to FIG. 5. Initially, signals from a plurality of nodes participating in a teleconference are received in a step 502, which also may comprise decoding of the received signals. The received signals are analyzed in a next step 504. The analysis may relate to e.g. voice activity, signal energy, or any other property, which enables an appointment of a dominant signal in a next step 506. For example, the voice signal with the highest energy may be appointed "dominant signal". This signal may then remain being the dominant signal until another signal comprises the voice signal with the highest energy, whereupon this other signal is appointed "dominant signal".

When a dominant signal has been appointed, an encoder, which is to be used to encode a mix of signals from the participating parties, is adapted 508 based on information related to the dominant signal, e.g. the signal itself or coding parameters, such as IPC, voicing, pitch or gain parameters. At least two of the received signals are mixed in a step 510. Typically, all signals, possibly except one or two; or, a certain fixed number of non-active channels, are mixed together. The mixed signal is then encoded 512 using the adapted encoder. The encoded signal is then provided to at least one of the nodes, or parties, participating in the teleconference.

Figure 6:
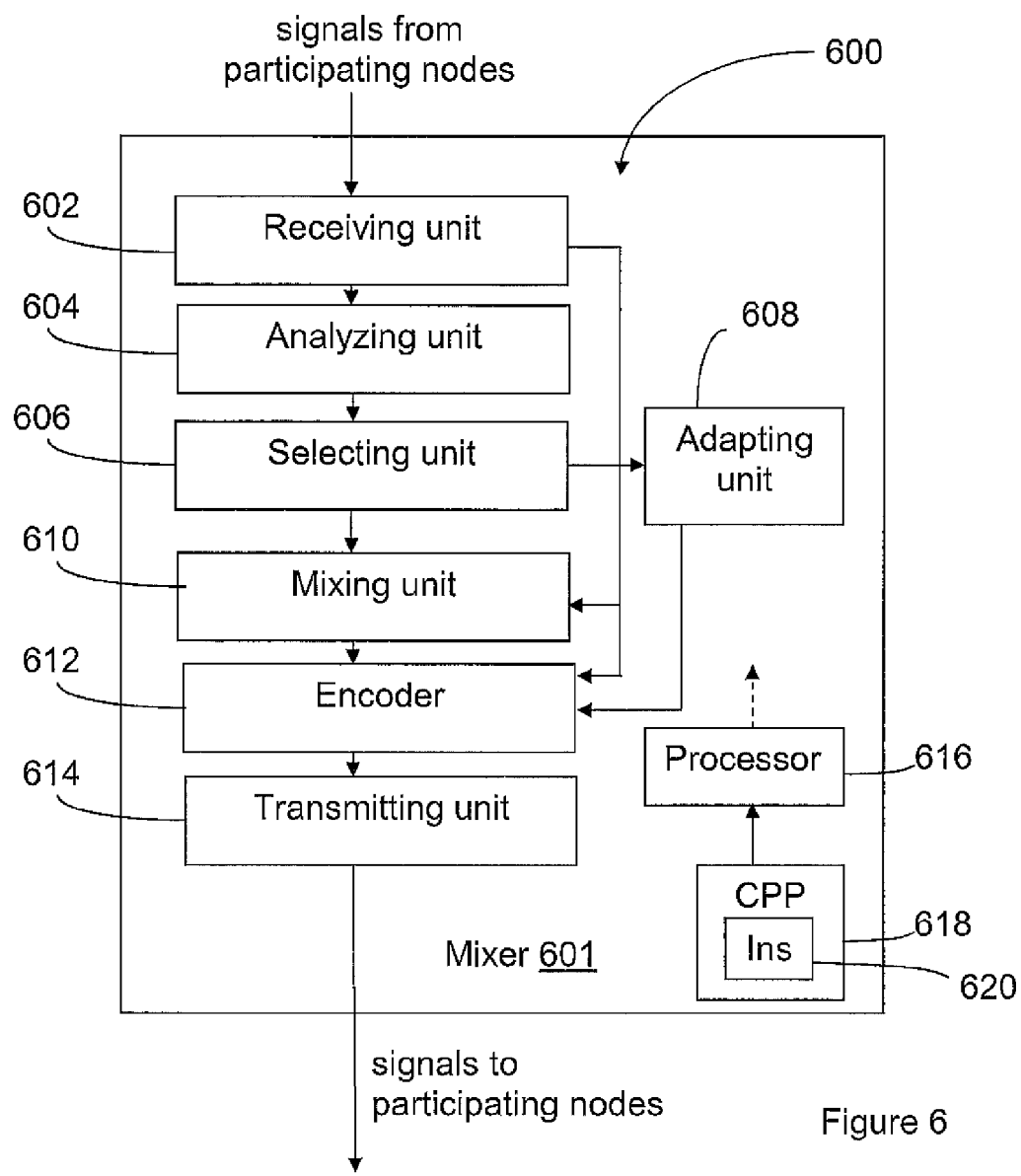
FIGS. 6 and 7 are block diagrams illustrating different exemplary embodiment of an arrangement in a conferencing bridge.

Exemplary Arrangement, FIG. 6

Below, an exemplary arrangement 600, adapted to enable the performance of the above described procedure, will be described with reference to FIG. 6. The arrangement 600 comprises a receiving unit 602, which is adapted to receive signals transmitted from nodes participating in a teleconference. The receiving unit may comprise a decoder, adapted to decode the received signals. The arrangement 600 further comprises an analyzing unit, adapted to analyze the received signals in terms of e.g. voice activity and signal energy.

The arrangement 600 further comprises a selecting unit 606, adapted to appoint one of the received signals as being a dominant signal, based on the result of the analysis. The arrangement 600 further comprises an adapting unit 608, adapted to adapt an encoder based on information related to the dominant signal, i.e. the signal itself or coding parameters such as IPC, voicing, pitch or gain. The arrangement 600 further comprises a mixing unit 610, adapted to mix at least two of the received signals; and an encoder 612, adapted to encode mixed signals. The arrangement 600 further comprises a transmitting unit, adapted to provide the encoded mixed signal to at least one of the nodes participating in the teleconference.

In FIG. 6 is also illustrated a computer program product, CPP, 618 which comprises instructions 620, which when executed by a processor 616, or similar, will cause the unit 602-614 to perform their tasks according to any embodiments of the above-described procedure. Connections between the processor 616 and the unit 602-614 are schematically illustrated by a dashed arrow from processor 616.

Figure 7:
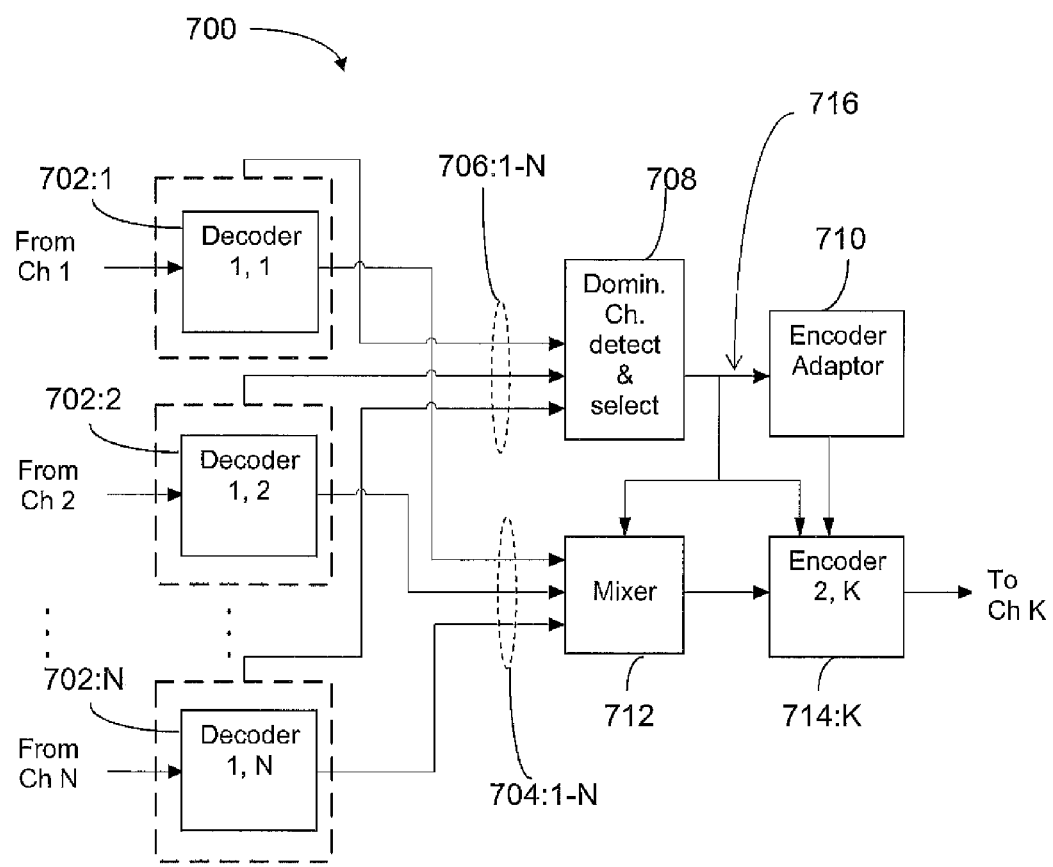

Exemplary Embodiment, FIG. 7

An exemplary embodiment is illustrated in FIG. 7. FIG. 7 illustrates an MCU operation mixing up to N input channels, channels 1 . . . N, to one output channel, channel K, where the input channels carry signals from N nodes participating in a teleconference, and the output channel is an exemplary output channel, which carry a signal to the participating node K. The coded speech signals of the N input channels are in a first step decoded to a PCM representation by the decoder units Decoder 702:1-Decoder 702:N. The resulting PCM speech signals 704:1-N are fed, potentially after some further signal processing such as gain adjustment, to the Mixer 712, which in the simplest case performs a mere addition of these PCM signals 704:1-N, possibly excluding the input signal from channel K and/or the dominant signal. The mixed signal is then encoded with Encoder 714:K, producing the coded output signal that is to be transmitted to channel K.

The different input channel signals are further fed to an active channel, or dominant channel, detection and selection unit 708 that identifies or appoints the presently active, or dominant, channel and output the dominant channel signal. The channel signals 706:1-N fed to the detection and selection unit 708 may have different format or representations, i.e. they do not necessarily have the same format as the PCM signals 704:1-N. The channel signals 706:1-N may e.g. be represented as the received, coded, signals from the nodes prior to decoding; as PCM signal, i.e. after decoding; as codec parameters, or as a combination thereof. The dominant channel signal is fed, e.g. in one of the above mentioned formats, to an Encoder Adaptor unit 710 that modifies the encoding of the mixed signal in Encoder 714:K such that the distortions of the dominant channel caused by the codec tandem configuration are reduced. The dominant channel signal, or an indication thereof 716, may also be used as input to the Mixer 712 and the encoder 714:K, thus allowing for instance to exclude the dominant channel signal from the mixing, and instead provide the active channel signal to the encoder as a separate input signal.

It should be noted that FIGS. 6 and 7 merely illustrate various functional units of the arrangement 600 and 700 in a logical sense. The functional unit could also be denoted e.g. "modules" or "circuits", or be parts of circuits. However, the skilled person is free to implement these functions in practice using any suitable software and/or hardware means, such as e.g. ASICs (Application-Specific Integrated Circuit), FPGAs (Field Programmable Gate Array) and DSPs (Digital Signal Processor). Thus, the invention is generally not limited to the shown structure of the arrangements 600 and 700.

Encoder Adaptation

The Encoder Adaptation may be performed in such a way that the parameter analysis, such as e.g. the IPC analysis and Open-loop pitch analysis, is based only on the dominant channel signal. This implies that the encoder has a better capability to faithfully represent the dominant channel signal, which is the most important signal, than the other channel signals, which are less important. One possibility to implement this kind of adaptation is to use the decoded PCM signal of the dominant channel in the parameter analysis blocks of the encoder. Another preferred possibility is to rely on or use the corresponding coded parameters of the dominant channel as received from the respective UE. This has the advantage that parameter re-estimation and quantization is avoided and no additional parameter distortion is introduced. This embodiment is possible if the codec used for the incoming dominant channel is of the same kind as, or at least parameter compatible with, the codec used for the outgoing channel K. Even a combination of parameter analysis for the mixed channel signal and the above described parameter derivation from the dominant signal is possible and beneficial.

Embodiments Comprising Scalable Codecs

Figure 8:
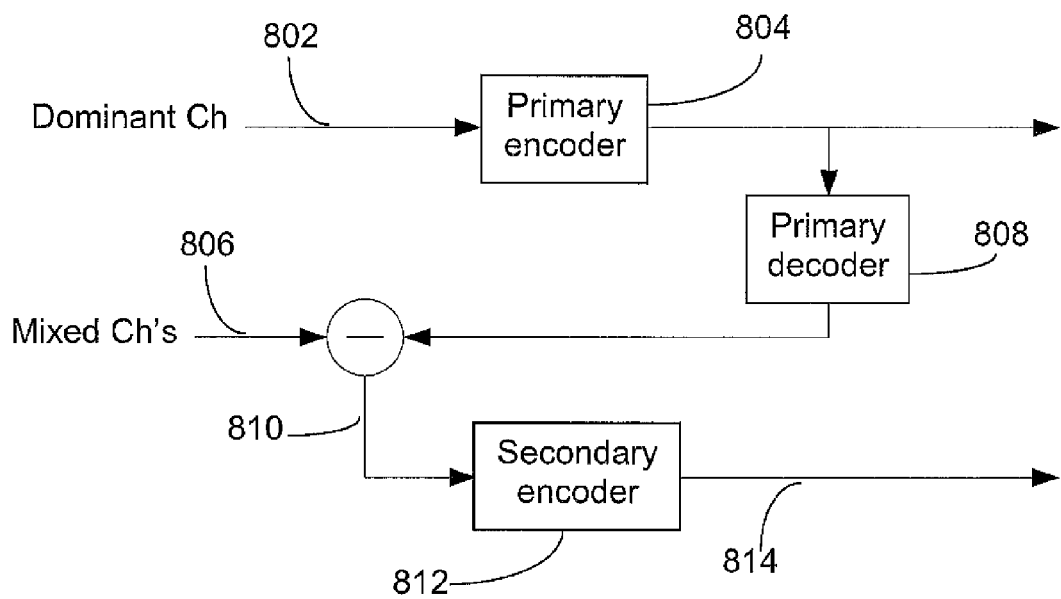
FIGS. 8 and 9 are schematic views of alternative realisations of an encoder, according to different embodiments.

Some embodiments of the invention may involve the use of an embedded scalable codec as the codec, or encoder, which is adapted using information related to the dominant signal. FIG. 8 shows an exemplary schematic view of such a scalable codec. The scalable codec in FIG. 8 has at least two layers, where the core layer comprises a primary codec and the second layer, or enhancement layer, comprises a secondary codec. Unlike the processing that would have been done according to the prior art, the codec is adapted such that the primary encoder is here fed only with the dominant channel signal, rather than with the output signal of the Mixer. This allows the coding distortion with respect to the dominant channel signal to be minimized.

The secondary encoder of the scalable codec is fed with the output PCM signal of the Mixer. Hence, the enhancement layer of the codec is used to encode the less important non-dominant, or inactive, channel signals. Assuming that the dominant channel signal is amongst the channel signals which are added together in the Mixer, the use of the exemplary codec structure in FIG. 8 results in that the secondary codec will encode, besides non-dominant channel signals, the primary coding residual of the dominant channel signal, and hence minimize the coding error of the active channel signal even further.

Figure 9:
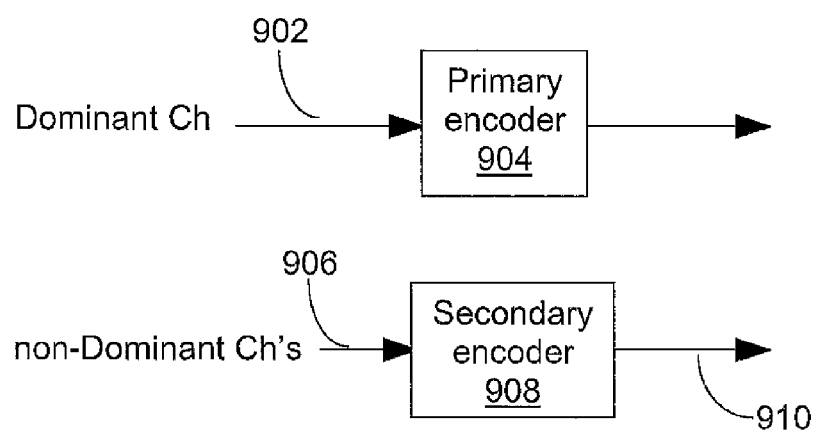

A related embodiment involving a scalable codec is shown in FIG. 9. Here, as in the previous embodiment, the dominant channel is encoded using the primary codec. However, in this example, the active channel signal is not represented in any form in the mixed signal, which is fed to the secondary codec. As a consequence, the primary coding error of the dominant channel signal is not further reduced by the secondary coding, and the secondary coding only addresses the non-dominant or inactive channel signals. However, the advantage of this embodiment is that the primary decoding of the active channel signal, which was performed in the previous example, is avoided, which is beneficial both in terms of reduced computational complexity and coding delay.

For the embodiments involving an embedded scalable codec, it is to be noted that parameter re-estimation and quantization can be avoided if the primary encoder is parameter compatible with the codec used for decoding of the incoming dominant channel signal, which enables that codec parameters related to the dominant channel could be retained for use in the primary encoder. This may even allow skipping the primary encoding completely and instead using the coded dominant signal as received from the respective dominant channel as primary encoded signal.

One desirable property of the embodiments involving a scalable codec is that it allows for taking full advantage of the scalability in the sense that when transmission resources so require, it is possible to discard the enhancement layer(s), and to proceed with e.g. further transmission or processing, retaining only the core layer. The core layer will then contain the most important channel signal, i.e. the dominant channel signal, with best possible quality.

Mixing

Figure 10:
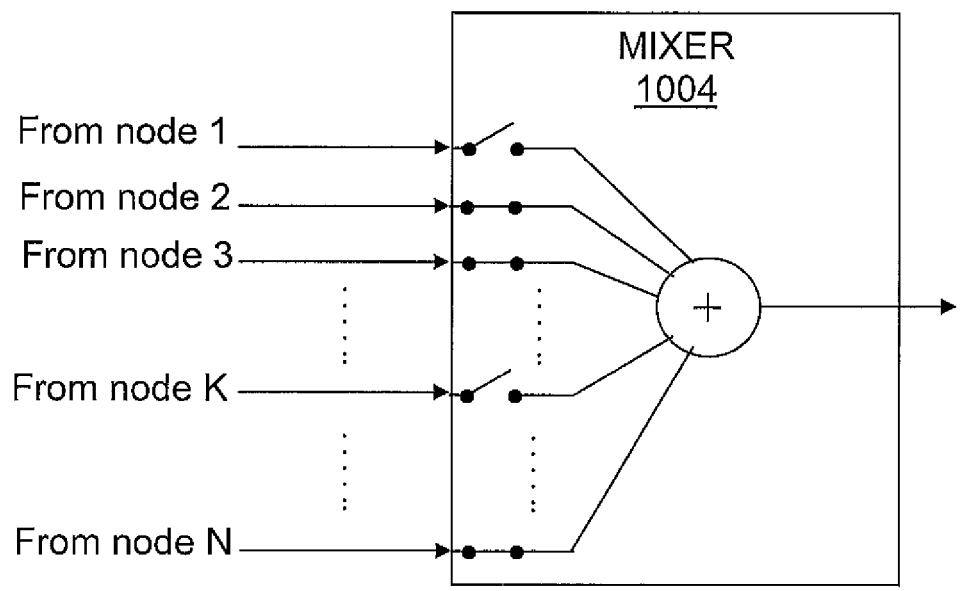
FIG. 10 is a schematic view of an exemplary way of separating out signals which should not be part of a mixed signal.

Typically, one mixing is performed per participating node in the teleconference in the above described exemplary embodiments. One mixing per node enables e.g. excluding of the signal originating from the node to which the encoded mixed signal is destined. However, the mixed signal destined to e.g. completely silent or inactive parties will be approximately the same for all of said silent parties. Thus, one mixing may be sufficient for covering the "silent" nodes, i.e. the mixed encoded signal destined to a "silent" node is provided also to the other "silent" nodes. Further, the dominant signal could be excluded from the mixing of signals, e.g. when using scalable codecs, and instead be provided to the encoder separately, as previously described. The signals which are to be excluded could, e.g., be disconnected in the mixer by a set of switches, as illustrated in FIG. 10 or by applying a set of volume controls that could be turned to zero.

Final Remarks

The general advantage of the invention is that quality degradations in the coding of multi-party conferencing signals that are subject to processing in codecs in tandem configuration, i.e. consecutive codecs, and improper modeling of the mixed signal can be reduced, as compared to when applying the existing prior art.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. The invention is generally defined by the following independent claims.

References

[1] ITU-T Recommendation G.711, "Pulse code modulation (PCM) of voice frequencies on a 64 kbps channel", November 1988

[2] ITU-T Recommendation G.727, "5-, 4-, 3- and 2-bit/ sample embedded adaptive differential pulse code modulation (ADPCM)", December 1990

[3] ITU-T Recommendation G.729.1, "G.729 based Embedded Variable bit-rate coder. An 8-32 kbit/s scalable wideband coder bitstream interoperable with G.729", May 2006

[4] ITU-T Recommendation G.718, "Frame error robust narrowband and wideband embedded variable bit ate coding of speech and audio from 8-32 kbit/s", June 2008

[5] ISO/IEC 14496-3: 2001, Information technology—Coding of audio-visual object—Part 3: Audio

[6] ISO/IEC JIC1/SC29/WG11 (MPEG), Document N8853, "Call for Proposals on Spatial Audio Object Coding", 79th MPEG Meeting, Marrakech, January 2007

[7] ITU-TW P3/16, Document AC-0701-06, "Low-Delay Wideband Extension to G.711 for IP Phone Services", January 2007

[8] ITU-T Rec. G.711.1 (03/2008)—Wideband embedded extension for G.711 pulse code modulation

[9] Zinser, R L, Choong, P T, Koch, S. R, "2.4 kb/sec compressed domain teleconference bridge with universal transcoder", Proceedings of the 2001 IEEE International Conference on Acoustics, Speech, and Signal Processing, (ICASSP '01), 2001, Volume: 2, page(s): 957-960

The invention claimed is:

1. A method for encoding signals in teleconferencing, comprising:
receiving signals from a plurality of nodes participating in a teleconference;
analyzing the received signals;
appointing one of the received signals as a dominant signal;
forming an adapted encoder by adapting an encoder based on information related to the dominant signal;
forming a mixed signal by mixing at least two of the received signals, the at least two received signals including the dominant signal;
forming an encoded mixed signal by encoding the mixed signal using the adapted encoder; and
providing the encoded mixed signal to at least one of the nodes participating in the teleconference;
wherein the adapting comprises adapting the encoder to base encoding on the dominant signal such that the dominant signal has a relatively higher weight in encoding than the other signals received from the plurality of nodes;
wherein the information related to the dominant signal comprises either the dominant signal itself, upstream of any mixing with any of the other received signals, or coding parameters for the dominant signal, wherein the encoder is part of a scalable codec, the scalable codec comprising a primary codec providing primary encoding/decoding and a secondary codec providing secondary encoding/decoding, wherein the adapted encoder is a primary encoder in the primary codec; and
using the secondary codec in the encoding of the mixed signal; and
at least partially removing the dominant signal, or an approximation of the dominant signal, from the mixed signal before secondary encoding when the mixed signal comprises the dominant signal.

2. The method of claim 1, further comprising separately providing the dominant signal, or an indication of the dominant signal, to at least one of a mixer and the adapted encoder.

3. The method of claim 1, wherein the providing comprises providing the mixed encoded signal to a node k in the plurality of nodes, wherein the mixed encoded signal does not comprise a signal received from the node k.

4. The method of claim 1, wherein the encoding is based on at least one of:
a Pulse Code Modulation representation of the dominant signal; and
coded parameters of the dominant signal as received from a node of the plurality of nodes that conveyed the dominant signal.

5. The method of claim 1, wherein the adapting comprises adapting the encoder to base parameter analysis on the dominant signal such that the dominant signal has a relatively higher weight in the parameter analysis than the other signals received from the plurality of nodes.

6. The method of claim 5, wherein the parameter analysis comprises one or more of:
Linear Predictive Coding analysis;
open-loop pitch analysis;
closed-loop pitch analysis;
gain parameter analysis; and
voicing parameter analysis.

7. The method of claim 5, wherein the parameter analysis is based on at least one of:
a Pulse Code Modulation representation of the dominant signal; and
coded parameters of the dominant signal as received from a node of the plurality of nodes that conveyed the dominant signal.

8. The method of claim 1, wherein the adapting comprises feeding the primary encoder with only the dominant signal.

9. The method of claim 1, wherein the primary codec is parameter compatible with a codec used for decoding the received dominant signal.

10. The method of claim 9, further comprising providing codec parameters related to the dominant signal for use in the primary codec.

11. The method of claim 9, further comprising retaining at least a part of the dominant signal as received, or codec parameters related to the dominant signal as received, for use in the primary encoding.

12. The method of claim 1, wherein the appointing of the dominant signal comprises weighting the candidate signals based on at least one of the following: a type of node from which the signal is received;
a codec type used for encoding the signal in the node from which the signal is received;
a level of background noise in the signal;
a location of the node from which the signal is received; and
an Internet Protocol address from which the signal is received.

13. A conferencing bridge device configured to encode signals in teleconferencing, comprising circuitry configured as:
a receiving unit configured to receive signals from a plurality of nodes participating in a teleconference;
an analyzing unit configured to analyze the received signals;
a selecting unit configured to appoint one of the received signals as a dominant signal;
an adapting unit configured to form an adapted encoder by adapting an encoder based on information related to the dominant signal;
a mixing unit configured to form a mixed signal by mixing at least two of the received signals, the at least two received signals including the dominant signal;
an encoder configured form an encoded mixed signal by encoding the mixed signal; and
a transmitting unit configured to provide the encoded mixed signal to at least one of the nodes participating in the teleconference
wherein the encoder is further configured to base encoding on the dominant signal such that the dominant signal has a relatively higher weight in encoding than the other signals received from the plurality of nodes; and
wherein the information related to the dominant signal comprises either the dominant signal itself, upstream of any mixing with any of the other received signals, or coding parameters for the dominant signal,
wherein the encoder is part of a scalable codec, the scalable codec comprising:
a primary codec configured to provide primary encoding/decoding; and a secondary codec configured to provide secondary encoding/decoding; wherein the adapted encoder is a primary encoder in the primary codec,
wherein the encoder is further configured to encode the mixed signal using the secondary codec; and wherein the encoder is further configured to at least partially remove the dominant signal, or an approximation of the dominant signal, from the mixed signal before secondary encoding when the mixed signal comprises the dominant signal.

14. The conferencing bridge device of claim 13, wherein the conference bridge device is further configured to separately provide the dominant signal, or an indication thereof, to at least one of the mixing unit and the adapted encoder.

15. The conferencing bridge device of claim 13, wherein the conference bridge device is further configured to exclude a signal received from a node k from a mixed signal provided to the node k.

16. The conferencing bridge device of claim 13, wherein the encoder is further configured to base the encoding on at least one of:
a Pulse Code Modulation representation of the dominant signal; and
coded parameters of the dominant signal as received from a node of a channel conveying the dominant signal.

17. The conferencing bridge device of claim 13, wherein the encoder is further configured to base parameter analysis on the dominant signal such that the dominant signal has a relatively higher weight in the parameter analysis than the other signals received from the plurality of nodes.

18. The conferencing bridge device of claim 17, wherein the parameter analysis comprises one or more of the following:
Linear Predictive Coding (LPC) analysis;
open-loop pitch analysis;
closed-loop pitch analysis;
gain parameter analysis; and
voicing parameter analysis.

19. The conferencing bridge device of claim of claim 17, wherein the encoder is further configured to base the parameter analysis on at least one of: a Pulse Code Modulation representation of the dominant signal; and
coded parameters of the dominant signal as received from a node of the plurality of nodes that conveyed the dominant signal.

20. The conferencing bridge device of claim 13, wherein the encoder is configured to feed only the dominant signal to the primary encoder.

21. The conferencing bridge device of claim 13, wherein the primary encoder is configured to be parameter compatible with a codec used for decoding the received dominant signal.

22. The conferencing bridge device of claim 21, wherein the conference bridge device is further configured to provide codec parameters related to the dominant signal to the encoder, for use in the primary codec.

23. The conferencing bridge device of claim 21, wherein the conference bridge device is further configured to retain at least a part of the coded dominant signal as received, or codec parameters related to the coded dominant signal as received, for use in the primary encoding.

24. The conferencing bridge device of claim 13, wherein the conference bridge device is further configured to adjust the probability of a signal being appointed dominant signal based on at least one of the following:
a type of node from which the signal is received;
a codec type used for encoding the signal in the node from which the signal is received;
a level of background noise in the signal;
a location of the node from which the signal is received; and
an Internet Protocol address from which the signal is received.

* * * * *